Jan. 30, 1945. G. A. LYON 2,368,243
WHEEL STRUCTURE
Filed April 23, 1943
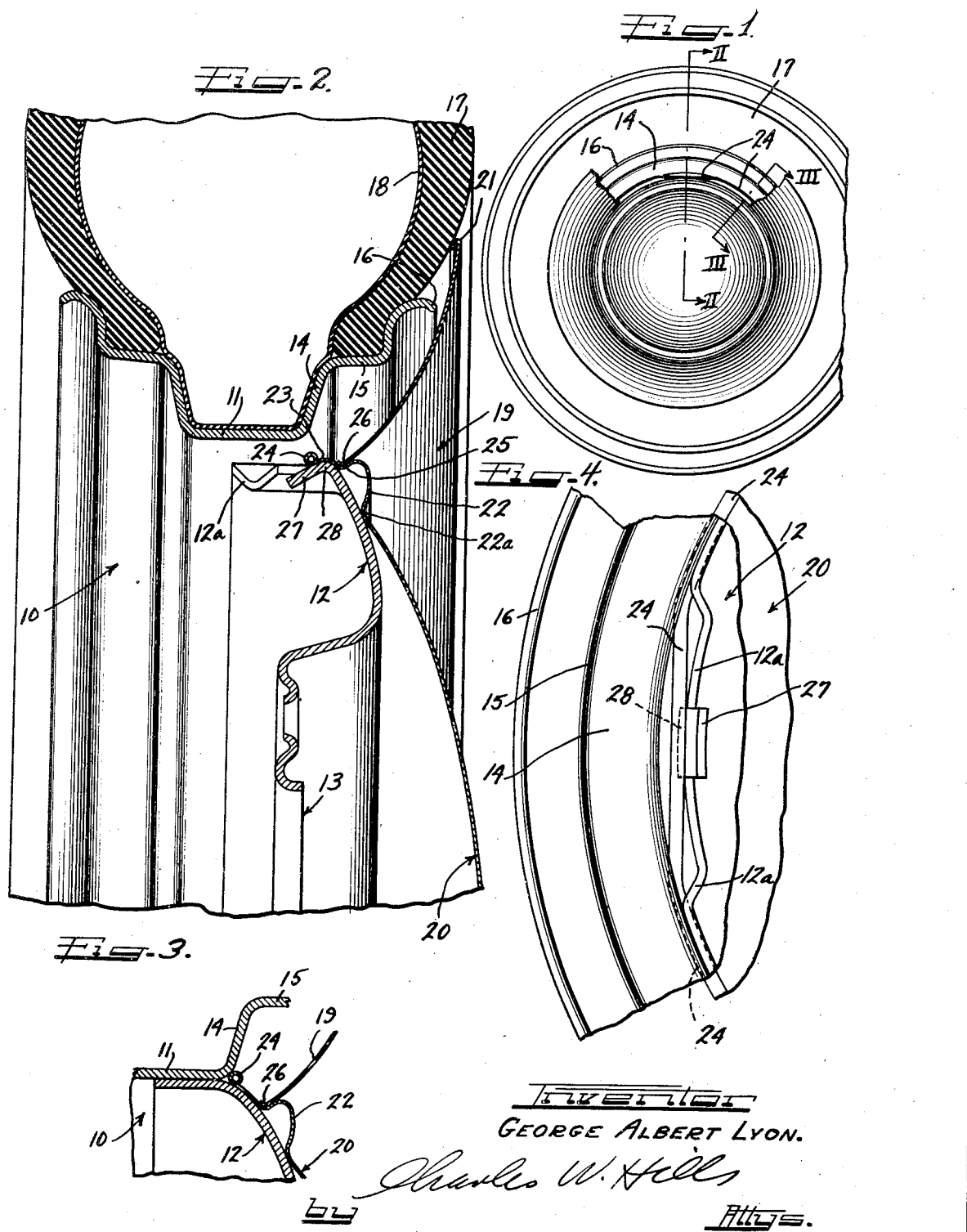
Inventor
GEORGE ALBERT LYON.
by Charles W. Hills
Attys.

Patented Jan. 30, 1945

2,368,243

UNITED STATES PATENT OFFICE 2,368,243

WHEEL STRUCTURE

George Albert Lyon, Allenhurst, N. J.

Application April 23, 1943, Serial No. 484,136

9 Claims. (Cl. 301—37)

This invention relates to an improved wheel structure and is directed more particularly to a novel wheel cover assembly and a novel retaining arrangement whereby it is secured over the outer face of the wheel structure.

It is an important object of the present invention to provide in a wheel structure, improved retaining means whereby a cover assembly may be connected directly with the wheel thus obviating the necessity of auxiliary retaining elements.

Still another object of the invention is to provide for a wheel structure a novel multi-part cover assembly wherein one of the parts is associated in retaining engagement directly with the wheel body in a novel manner and which is so arranged as to constitute the retaining means for the other cover member.

In accordance with the general features of this invention there is provided herein a multi-part cover assembly including a central hub cap simulating portion and an outer annular, resiliently flexible portion arranged to overlie the outer side of the tire rim of a wheel structure to which it is attached, said outer annular portion being constructed from a resiliently flexible material such as a synthetic plastic, or rubber, either natural or synthetic, whereby said annular portion may be flexed axially outwardly away from the wheel with which it is associated to render the rear side thereof accessible and to permit the insertion of a pry-off tool whereby the cover assembly may be removed from the wheel. The outer annular cover portion is provided with a cross-sectional configuration of such shape and magnitude that it extends over the outer side of the tire rim of a wheel structure and radially inwardly over the junction between the tire rim and a central load bearing portion of the wheel, to constitute in effect a continuation of the side wall of a tire in the tire rim to give the appearance of being a part thereof and to give the appearance of being a white side wall of a massive tire mounted on a wheel of minimum dimensions, when colored white.

In accordance with other general features of this invention, there is provided herein an improved wheel structure and multi-part cover assembly, said wheel structure having a substantially axially inwardly extending flange at the outer margin thereof and having integral tabs or sections struck from said flange and being formed so that the axial inner ends thereof are depressed radially inwardly while the axially outer portions thereof, forming the junction with the wheel body, are pressed radially outwardly to form a hump adapted to receive a snap-on portion of a central, circular, hub cap simulating cover portion, said portion being further arranged to retainingly receive the inner peripheral edge of an outer annular cover part arranged to conceal the radially outer portion of the axially outer side of a wheel structure.

Many other objects and advantages of the invention will become apparent from the following description and accompanying drawing in which:

Figure 1 is a side elevation of a wheel structure embodying my invention, a portion being broken away for illustrative purposes;

Figure 2 is a fragmentary cross-sectional view taken on the line II—II of Figure 1;

Figure 3 is a fragmentary cross-sectional view taken on the line III—III of Figure 1; and Figure 4 is a fragmentary rear elevational view of the portion of the wheel structure shown in Figure 2.

It is to be understood that the embodiment disclosed herein is for illustrative purposes only and may be changed or modified without departing from the spirit and scope of the invention as set forth in the appended claims.

As shown herein 10 represents generally a multi-flange drop center tire rim having a base flange 11 secured to a central body part or load bearing portion 12 by riveting or welding or the like, said central load bearing portion 12 being provided at the outer margin thereof with a substantially axially inwardly extending flange having circumferentially spaced depressed portions 12a and having at the central part thereof a bolt-on flange 13. The tire rim 10 is further provided with opposite side wall flanges 14, opposite intermediate flanges 15 and opposite edge portions 16, into which is seated a tire 17 having an inner tube 18.

The cover assembly shown herein includes an outer annular portion 19 and a central circular, hub cap simulating portion 20, these parts preferably being attached together in a manner to be presently described so as to constitute a unitary structure in which the annulus 19 protects the central circular part 20 against damage when the unit is dropped edgewise upon a hard surface.

As previously indicated the annular part 19 is preferably formed from a material giving it elastically, resiliently flexible characteristics such as those of a synthetic plastic or rubber, either natural or synthetic.

The outer annular portion 19 of the cover assembly is provided with a cross-sectional configuration of such shape and magnitude that it may extend radially outwardly beyond the edge portion 16 of the tire rim to terminate in a radially outer peripheral edge having a turned back portion 21 which presents to the adjacent portion of the side wall of the tire a smooth, non-abrading, non-cutting surface. This is important since, due to the radially outward extension of the cover member into adjacency with the side wall of the tire, the cover must flex resiliently locally to accommodate lateral expansion of the side walls of the tire under load bearing conditions and this flexing of the outer portion of the cover 19 is accompanied by sliding movement of the outer peripheral part thereof against the side wall of the tire.

As will be seen from Figure 1 the radial expanse of the cover member 19 is such that it extends radially inwardly over the outer side of the tire rim 10 to conceal the outer surface of the flanges thereof and radially inwardly beyond the junction between the tire rim and the body part 12 thus to also conceal the radially outer part of the body portion. It will also be noted that the cover member 19, being constructed as above described, prescribes a gradual radially inwardly, axially inwardly extending curve whereby it constitutes in effect a continuation of the side wall of the tire 17 to give the appearance of being a part thereof and the appearance of being a white side wall of a massive tire mounted upon a wheel structure of minimum dimensions, when colored white.

The central circular, hub cap simulating cover member 20 is provided at an outer marginal part thereof with a circular, axially outwardly extending bead 22 and a substantially axially inwardly extending snap-on flange 23 terminating in a peripheral snap-on bead 24. Between the bead 22 and the flange 23, the cover member 20 is configurated so as to provide a radially outwardly opening groove 25 which is arranged to receive the radially inner peripheral part 26 of the outer annular cover member 19 which may be resiliently snapped thereinto. The flange 23 is so configurated cross-sectionally as to provide a radially inwardly opening groove which is utilized to secure the same to the wheel structure in a manner to be presently described. As will be seen clearly from Figures 1 and 4, the flanges 23 and the bead 24 of the cover member 20 are provided with circumferentially spaced, inwardly depressed portions which are arranged for registry with the similarly depressed portions of the flange of the body member 12 when the cover is secured thereto.

While in the cover assembly shown herein, the flange 23 and the bead 24 of the cover member 20 are utilized in attaching the cover assembly to the wheel structure, it will be understood that, if desired, the radially inner margin of the cover member 19 may be provided with such a cross-sectional configuration so it may be secured directly to the wheel structure in a manner to be presently described in connection with the cover member 20.

As indicated previously, the attachment flange of the body part 12 is provided with circumferentially spaced depressed portions 12a. It is these depressed portions of the flange which are utilized in providing improved retaining means for engaging the cover assembly. As shown in Figures 2 and 4, the depressed portions 12a of the flange of the central load bearing portion are cut transversely at a substantially central portion thereof to provide in each an integral tab, or retaining section 27 which is so cross-sectionally formed that the axially inner terminal portion thereof is radially inwardly depressed while the axially outer portion thereof, which serves as the junction with the central load bearing portion 12 of the wheel structure, is slightly raised to provide an attachment hump 28. As will be seen from Figure 3 the marginal flange of the central load bearing portion 12 normally abuts, and is secured to the radially inner surface of the base flange 11 of the tire rim 10. Consequently, the disposition of the circumferentially spaced retaining tabs 27 will be slightly radially inward of the plane through the junction of the tire rim and the central load bearing portion of the wheel structure. In order that the snap-on flange 23 and the bead 24 of the cover assembly may be aligned with the retaining elements 17 for retaining engagement of spaced portions thereof with the wheel structure, the flange 23 and the bead 24, as shown in Figures 1 and 4 are flattened at circumferentially spaced portions arranged for alignment with the circumferentially spaced retaining sections 27.

Thus it will be seen that when the flattened sections of the flange 23 and the bead 24 are aligned with the respective humps 28 and retaining tabs 27, as shown clearly in Figure 4, axial inward movement of the cover assembly will cause the bead 24 to override the radially outer surface of the humps 28 so that the groove in the snap-on flange 23 of the cover assembly comes to rest in nested relationship over the respective humps 28.

From Figures 2 and 3 it will be seen that axial inward movement of the cover assembly to obtain the foregoing snap-on engagement is delimited by the engagement of the junction 22a between the central body portion of the cover member 20 and the bead or rib 22 thereon and also by engagement of circumferentially intermediate portions of the bead 24 against the corner formed at the junction of the tire rim 10 and the central load bearing portion 12 of the wheel structure.

From the foregoing it will be seen that there is provided herein an improved cover assembly for a wheel structure, said assembly including a central circular cover member which is provided with a reinforcing rib at a radially outer part thereof, this rib also serving to retainingly engage an outer annular cover member which has the radially inner extremity thereof in engagement with the circular cover member. There is also provided a novel retaining arrangement which is formed from the wheel structure itself to provide substantially axially inwardly extending integral tabs or sections affording humps for retainingly engaging an attachment part of the cover assembly in snap-on pry-off engagement. This enables the cover assembly to be attached directly to a radially inner part of the wheel structure without the aid of auxiliary retaining members.

What I claim is:

1. In a wheel structure including a tire rim and a central load bearing portion having an axially extending marginal flange, a cover assembly including a substantially axially inwardly extending attachment part and retaining means for securing said cover assembly on the outer side of the wheel structure comprising circumferentially spaced, integral tabs struck from said flange and formed to provide retaining humps over which the attachment part of the cover assembly may be sprung into detachable engagement therewith.

2. In a wheel construction, a tire rim and a central load bearing portion, an axially extending marginal flange on said load bearing portion, retaining means for detachably securing a cover assembly over the outer side of the wheel structure including integral retaining tabs struck from the flange of the central load bearing portion and formed to present radially outwardly extending means on the central load bearing portion for detachably receiving an attachment part of a cover assembly pressed axially inwardly of the wheel structure.

3. In a wheel structure including a tire rim and a central load bearing portion, a marginal axially extending flange on said load bearing portion, said flange being provided with circumferentially spaced, radially inwardly depressed portions, retaining means for securing a cover assembly over the outer side of the wheel structure, said retaining means comprising integral tabs struck from said flange in the body portion at the radially inwardly depressed portions thereof, said tabs each having a part thereof formed to provide means extending radially outwardly of a plane through the respective depressed portions for detachably receiving an attachment part of a cover assembly disposed over the outer side of the wheel.

4. In a wheel structure including a tire rim and a central load bearing portion having a marginal flange arranged for attachment to the tire rim, said flange having circumferentially spaced, radially inwardly depressed portions arranged to provide retaining means for detachably receiving a cover assembly disposed over the outer side of the wheel structure, said retaining means including integral tabs struck from the radially inwardly depressed portions of the flange and formed to provide protrusions at each of said radially depressed portions, said protrusions being disposed at the junction of the respective depressed portion of the flange with the outwardly facing part of the central load bearing portion.

5. In a wheel structure having a tire rim and a central load bearing portion including an axially extending marginal flange arranged for attachment to the tire rim and having circumferentially spaced, radially inwardly depressed portions, a cover assembly for disposition over the outer side of the wheel structure and including an axially inwardly extending, circular attachment portion, retaining means for detachably holding said attachment portion of the cover assembly on the wheel, said retaining means comprising a plurality of snap-on elements at said radially depressed portions of the flange, said attachment portion of the cover assembly including radially inwardly depressed portions arranged for alignment with the depressed portions of said flange and having intermediate portions arranged to abut the outer side of the wheel structure when said depressed portions are detachably engaged with the wheel load bearing portion.

6. In a cover assembly for disposition over the outer side of a wheel structure, a radially outer, annular portion arranged to extend over the outer side of a tire rim of an associated wheel structure and a central part arranged to overlie the outer side of a central load bearing portion of an associated wheel structure, said central part being formed at the radially outer margin thereof to provide an outwardly extending reinforcing, retaining rib and a radially outwardly opening groove disposed at the axially inner side of said rib and having a substantially axially inwardly extending snap-on flange at the radially outer marginal edge thereof, said groove being arranged to receive the inner peripheral part of the outer cover member and said snap-on flange being arranged to detachably engage with the wheel structure to detachably secure the cover assembly thereon.

7. In a wheel structure having a tire rim and a central load bearing portion including an axially extending marginal flange provided with circumferentially spaced, radially inwardly depressed portions, a cover assembly for disposition over the outer side of the wheel structure and including substantially axially inwardly extending attachment means, retaining means for detachably engaging said attachment means to retain the cover assembly over the outer side of the wheel structure, said retaining means comprising distorted parts of said radially depressed portions of the flange.

8. In a unitary cover assembly for disposition over the outer side of a wheel structure, an outer, annular, resiliently, elastically flexible portion arranged to extend over the outer side of a tire rim of an associated wheel structure adapted to be flexed outwardly from an associated wheel structure to render the rear side thereof accessible and a central part arranged to overlie the outer side of the central load bearing portion of an associated wheel structure, said central part being formed at the radially outer margin thereof to provide a radially outwardly opening groove arranged to elastically receive the inner peripheral part of the flexible cover portion and having a substantially inwardly extending snap-on portion arranged for retaining engagement with the wheel structure.

9. In a cover assembly for disposition over the outer side of a wheel structure including a tire rim and a central load bearing portion, an outer, annular, non-metallic resiliently flexible portion arranged to extend over the outer side of a tire rim of an associated wheel structure and including a free outer edge adapted to be flexed outwardly from the associated wheel structure to render the rear side of said portion accessible without requiring detachment of the cover portion from the wheel structure, and a central part arranged for disposition on the outer side of the central load bearing portion of the associated wheel structure, said central part having a radially outwardly facing flange to which the inner peripheral part of the flexible cover portion is resiliently attached, and said central part also having a substantially inwardly extending portion arranged for detachable snap-on retaining connection with the wheel structure to clamp under tension the cover portion to the wheel structure.

GEORGE ALBERT LYON.